US005964836A

United States Patent [19]
Rowe et al.

[11] Patent Number: 5,964,836
[45] Date of Patent: Oct. 12, 1999

[54] APPARATUS, METHODS AND COMPUTER PROGRAM PRODUCTS FOR MANAGING WEB-PAGE-EMBEDDED SESSIONS WITH A HOST-BASED APPLICATION

[75] Inventors: Thomas Owings Rowe, Chapel Hill; Yih-Shin Tan, Raleigh, both of N.C.

[73] Assignee: International Business Machines Corporation, Armonk, N.Y.

[21] Appl. No.: 08/927,778

[22] Filed: Sep. 11, 1997

[51] Int. Cl.$^6$ .................................................... G06F 17/00
[52] U.S. Cl. ........................................... 709/221; 709/250
[58] Field of Search .............................. 395/500, 200.32, 395/200.47, 200.58, 200.59, 200.8, 200.51, 200.52

[56] References Cited

U.S. PATENT DOCUMENTS 5,754,830  5/1998  Butts ........................................ 395/500

*Primary Examiner*—Ellis B. Ramirez
*Attorney, Agent, or Firm*—Myers Bigel Sibley & Sajovec; Jeannie S. Ray-Yarletts

[57] ABSTRACT

Sessions with a host-based application are managed by embedding a user interface, such as a screen, for a first session between the remote computer and the application in a Web page displayed at a remote computer. Preferably, a Java applet is downloaded to the remote computer and processed to embed the user interface. The downloaded Java applet may also be processed to establish the first session between the remote computer and the application. Upon termination of the first session, the user interface is removed from the Web page. According to one aspect, a link object for accessing a second session between the remote computer and the application may be embedded in the Web page and, upon embedding the user interface for the first session in the Web page, the link object may be removed from the Web page. Upon termination of the first session, the user interface for the first session may be removed from the Web page, and the link object for the second session embedded in the Web page again. According to another aspect, the Web page is displayed in a first window, a second session established, and a user interface for the second session provided in a second window. The user interface includes a link object associated with the first session embedded therein. In response to user selection of the link object, the user is directed to the first window.

40 Claims, 10 Drawing Sheets

APPARATUS, METHODS AND COMPUTER PROGRAM PRODUCTS FOR MANAGING WEB-PAGE-EMBEDDED SESSIONS WITH A HOST-BASED APPLICATION

FIELD OF THE INVENTION

The present invention relates to data processing apparatus (systems), methods and computer program products, more particularly, to apparatus, methods and computer program products for interfacing with host-based applications.

BACKGROUND OF THE INVENTION

The Internet is a decentralized network of computers that can communicate with one another via a transmission control protocol/internet protocol (TCIP/IP). Although the Internet has its origins in a network created by the Advanced Research Project Agency (ARPA) in the 1960's, it has only recently become a worldwide communication medium. To a large extent, the explosive growth in use of the Internet is due to the development in the early 1990's of the worldwide Web (WWW), which is one of several service facilities provided on the Internet. Other facilities include a variety of communication services such as electronic mail, telnet, usenet newsgroups, internet relay chat (IRC), a variety of information search services such as WAIS and Archie, and a variety of information retrieval services such as FTP (file transfer protocol) and Gopher.

The WWW is a client-server-based facility that includes a number of servers (computers connected to the Internet) on which Web pages or files reside, as well as clients (Web browsers) which interface the users with the Web pages. Specifically, Web browsers and software applications such as WebExplorer® (IBM Corporation) or Navigator® (Netscape Communication Corporation) send a request over the WWW to a server requesting a Web page identified by a Uniform Resource Locator (URL) which notes both the server where the Web page resides and the file or files on that server which make up the Web page. The server then sends a copy of the requested file(s) to the Web browser, which in turn displays the Web page to the user.

The Web pages on the WWW may be hyper-media documents written in a standardized language called HyperText Markup Language (HTML). A typical Web page includes text together with embedded formatting commands, referred to as tags, which can be used to control font size, font style and the like. A Web browser parses the HTML script in order to display the text in accordance with the specified format.

Although many new computer applications are being developed for distributed processing environments such as the Web, there is still a large installed base of traditional computer systems having an architecture including a central host computer, typically a mainframe, and "dumb" computer terminals which are directly connected to ports of the host computer. Examples of such a configuration include IBM 3270, IBM 5250, and ASCII VT configurations in which a terminal communicates with a host according to a networking protocol such as TCP/IP. The networking protocol typically provides for structured grouping of data stream transmissions with a series of control characters followed by a block of displayable characters, a typical data stream comprising a plurality of sequentially transmitted control character blocks followed by displayable character blocks.

Because of the continued presence of such host-based applications, there is a need for techniques to integrate host-based content into the Web paradigm. For example, many companies have centralized information databases, services and the like which are accessible to employees from terminals or personal computers running terminal emulation software. Many companies desire to make this content accessible to customers through the Internet or to employees through an "intranet" which has a Web-like structure and user interface.

Conventional approaches for providing such access typically use conversion/translation techniques that employ emulation software resident at an intermediate Web server. Additional code typically executes on top of the emulation software that is capable of establishing a session from the intermediate server to a host and converting emulation screen output/input into a format understood by the browser, such as HTML files, Java GUI applets, or ActiveX controls. The intermediate code typically employs a private protocol to control the exchange of data between the server and browser in the converted format.

There are several potential problems with this technique. For example, use of an intermediate server may make it difficult to navigate a host session as if it were an integral part of a browser environment. The state of the host session typically is not maintained in real time on the browser, so a user may respond to an inappropriate screen. In addition, when a Web user leaves a session to surf other Web pages and comes back, the session may be disconnected or disrupted; indeed, many conventional Web-based host access solutions restrict users from leaving a session to access other Web pages, and may force a session disconnection if a user does so. Such restriction tends to be disruptive and can limit the potential flexibility offered by a Web-based solution.

SUMMARY OF THE INVENTION

In light of the foregoing, it is an object of the present invention to provide apparatus, methods and computer program products that can provide improved management of sessions with host-based applications.

This and other objects, features and advantages are provided according to the present invention by methods, systems and computer program products in which a user interface for a session between a remote computer and an application resident on a host computer is embedded in a Web page accessible to the remote computer. Preferably, the Web page is a host access page residing at a resource location which, when accessed by the remote computer, causes the Web page to be downloaded to the remote computer. A Java applet is preferably downloaded to the remote computer which, when processed at the remote computer, causes establishment of a session with the host-based application and embedding of a user interface for the established session in the downloaded Web page to thereby provide an "embedded" session, i.e., a session embedded in the host access web page. According to another aspect of the present invention, access to an embedded session in a first window is provided from a non-embedded session in a second window.

In particular, according to the present invention, sessions between a remote computer and an application resident on a host computer connected to the remote computer are managed by embedding a user interface, such as a screen, for a first session between the remote computer and the application in a Web page displayed at the remote computer. Preferably, a Java applet is downloaded to the remote computer, and the user interface is embedded by processing the downloaded Java applet. The downloaded Java applet may also be processed to establish the first session between the remote computer and the application. Upon termination of the first session, the user interface for the first session is removed from the Web page.

According to an aspect of the present invention, a link object for accessing a second session between the remote computer and the application may be embedded in the Web page prior to embedding of the user interface for the first session. Upon embedding the user interface for the first session in the Web page, the link object may be removed from the Web page. Upon termination of the first session, the user interface for the first session may be removed from the Web page, and the link object for the second session embedded in the Web page again.

According to another aspect of the present invention, the Web page is displayed in a first window. A second session is established, and a user interface for the second session is provided in a second window. The user interface includes a link object associated with the first session embedded therein. User selection of the link object associated with the first session may be accepted from a user at the remote computer. In response, the user is directed to the first window by, for example, displaying a message directing the user to the first window.

According to another aspect, a Session Vector is created which identifies sessions between the remote computer and the application. A session is established, and identified in the Session Vector. A user interface is then embedded in a Web page for the session identified in the Session Vector, for example, upon reloading the Web page at the remote computer. The Session Vector may be established by instantiating a Session Vector Object which maintains the Session Vector.

Related systems and computer program products are also described. Improved techniques for managing embedded host-based sessions are thereby provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
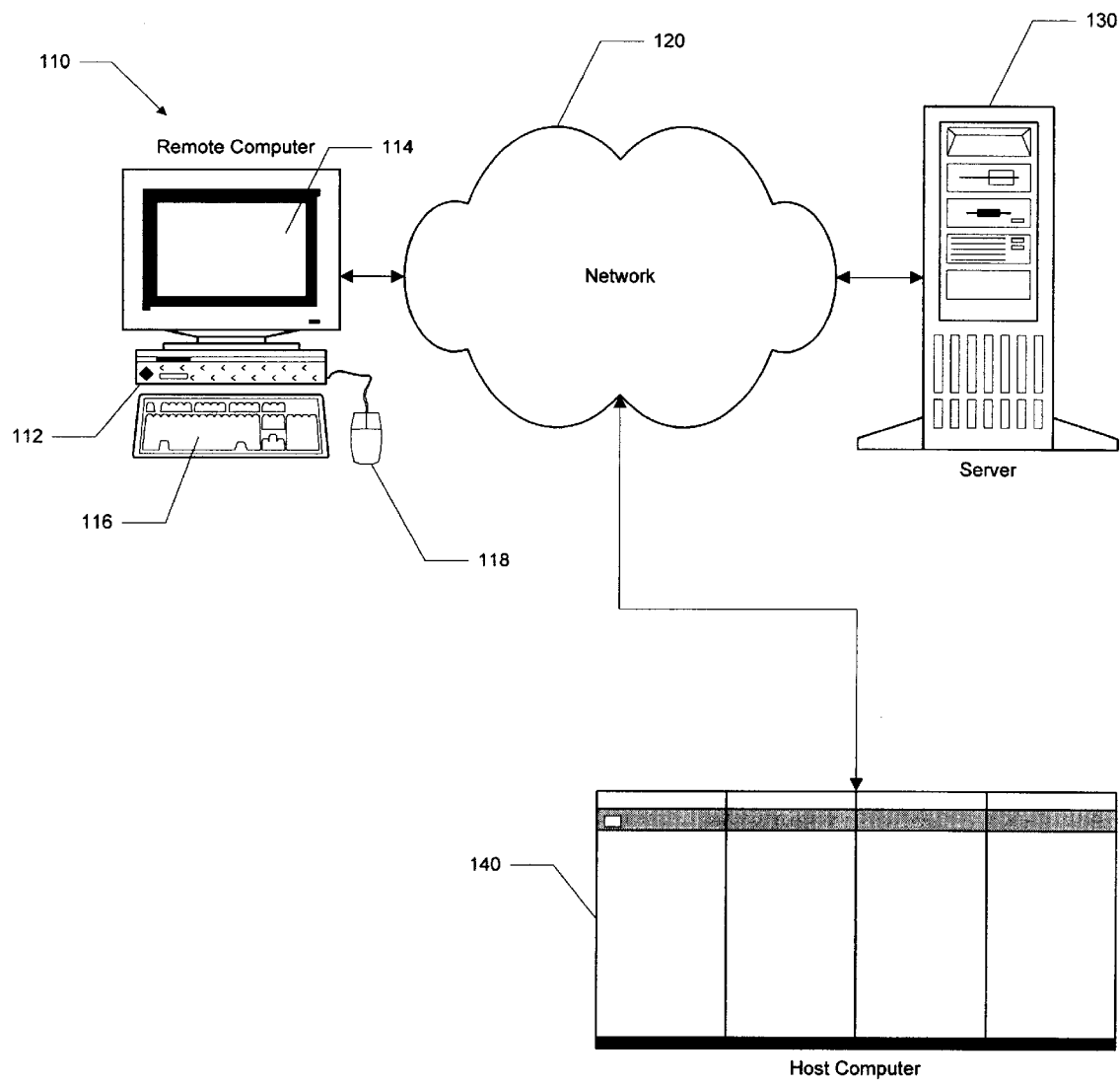
FIGS. 1 and 2 are schematic block diagrams illustrating system in which the methods and apparatus of the present invention may be embodied.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

In the discussion that follows, reference is made to "application." For purposes of the discussion here, "application" refers to terminal-type host-based applications. These applications include, but are not limited to, such mainframe applications as 3270 and 5250 applications which use screen-type user interfaces to display and receive data from a user at a terminal connected to the mainframe computer.

The description herein also refers to "objects," i.e., processing structures created according to object-oriented programming principles. Those skilled in the art will appreciate that, in general, objects are programming models which generally are defined by their "state" and "behavior." In the programming implementation of an object, the state of an object is defined by its fields, which may or may not be accessible from outside of the object. An object's behavior is defined by its methods, which manipulate instance variables (data for the object) to create a new state, and which also can create new objects. Typically, the object's methods are the only means by which other objects can access or alter its instance variables, with objects interacting with one another via messages. Object-oriented programming techniques are utilized in many modern programming languages, including C++ and Java.

Those skilled in the art will appreciate that although the description herein makes use of object-oriented programming concepts, the present invention may be embodied using other techniques which may not be considered "object oriented." For example, the present invention may be implemented using more a traditional procedural framework that, in effect, embodies functionality also attainable using object-oriented principles. Accordingly, those skilled in the art will appreciate that the present invention is applicable to object-oriented and non-object-oriented environments.

To provide an example of an object-oriented environment in which the systems, methods and computer program products of the present invention may be embodied, the discussion herein describes a Java environment. Java is an object-oriented programming language developed by Sun Microsystems, Mountain View, Calif. Java is designed to be portable and architecturally neutral, making it advantageous for distributed processing applications in which computers having a variety of different operating systems are interconnected. Java source code is compiled into a machine-independent format that can be run on any platform with a Java runtime system known as the Java Virtual Machine (JVM). The JVM is a process that emulates a virtual processor through the use of software on a real machine, allowing Java software to execute under diverse operating systems, including UNIX, Windows NT, and McIntosh.

Web browsers including Netscape Navigator® and Microsoft Internet Explorer® are referred to as Java-enabled browsers because they include a version of the JVM. Java applets are programs written in Java and configured to run within Java-enabled browsers. Handled in a manner similar to the way images are handled, Java applets may be displayed as part of a HyperText Mark Up Language (HTML) document. When an applet is loaded, it can present special effects, such as animation, graphics, and sound, perform real-time data updates and applications, and can interact with a user through a mouse, keyboard and various interface elements such as buttons, slides and text fields.

Java source code is compiled into bytecode using a Java compiler referred to as a Javac. Compiled Java programs are saved in files with the extension ".class". When a Java-enabled Web browser recognizes that an applet has been requested, a Java interpreter processes the applet bytecode on the JVM. The Java programming language and environment is extensively described in "The Java Tutorial: Object-Oriented Programming for the Internet," by Mary Campione and Kathy Walrath, published by Addison-Wesley Pub Co (1996).

A related United States Patent Application entitled "Systems, Methods and Computer Program Products for Conducting a Persistent Session with a Host-Based Application," assigned to the assignee of the present application, filed concurrently herewith and herein incorporated by reference in its entirety, describes a Host On-Demand process in which terminal emulation information, e.g., a Java applet, is loaded at a remote computer from a host access resource location, e.g., a Web page, in a network including the remote computer. The terminal emulation information is processed at the remote computer to conduct a persistent session between the remote computer and a host-based application, i.e., a session which persists when the remote computer accesses another resource location (or reloads the host access resource location). In this manner, a platform-independent solution is provided which does not required a mediating server in the session and which allows a user to navigate among resource locations without requiring termination of the session. Another United States Patent Application entitled "Systems, Methods and Computer Program Products for Managing Sessions with a Host-Based Application," assigned to the assignee of the present application, filed concurrently herewith, and incorporated by reference herein in its entirety, describes techniques for managing such host based systems by proving links to such host-based sessions in a Web page, preferably the same Web page accessed to download the terminal emulation information for conducting such host-based sessions.

According to the present invention, a user interface to a host-based session is embedded in a Web page. Preferably, the user interface is embedded in the same Web page used to download terminal emulation information as described above. Links to other sessions are removed from the Web page upon establishment of the user interface, and may be restored after the embedded session is terminated. Links to an embedded session may also be provided in other session windows. Selection of a link to an embedded session may direct a user at the remote computer to the appropriate window in which the session is embedded. For example, selection of the link may cause an information message to be displayed that directs the user to the appropriate window.

FIG. 1 illustrates a computer system in which the methods and apparatus of the present invention may be embodied. A network 120 includes a remote computer 110, such as a personal computer including such components as a central processing unit (CPU) 112, a display 114 and user input devices such as a keyboard 116 and a mouse 118. The remote computer 110 is connected to a server 130 of the network 120, as well as to host application resident at a host computer 140. Those skilled in the art will appreciate that the remote computer 110 may take other forms than the personal computer illustrated; for example, the remote computer 110 may include a so-called "network computer," i.e., a Web-enabled terminal with little or no local disk storage, or other computing device such as a personal digital assistant (PDA), personal communications system (PCS), or the like. Those skilled in the art will also appreciate that the server 130 make take various forms, including conventional PC-type servers or similar devices which may be addressable as locations in a network and have the capability to store information. Although host computer 140 will typically take the form of a traditional mainframe computer running a conventional terminal application such as an IBM 3270 application, those skilled in the art will appreciate that the host computer 140 may comprise various other apparatus that run applications that conduct input and output according to a terminal-type interface.

Figure 2:
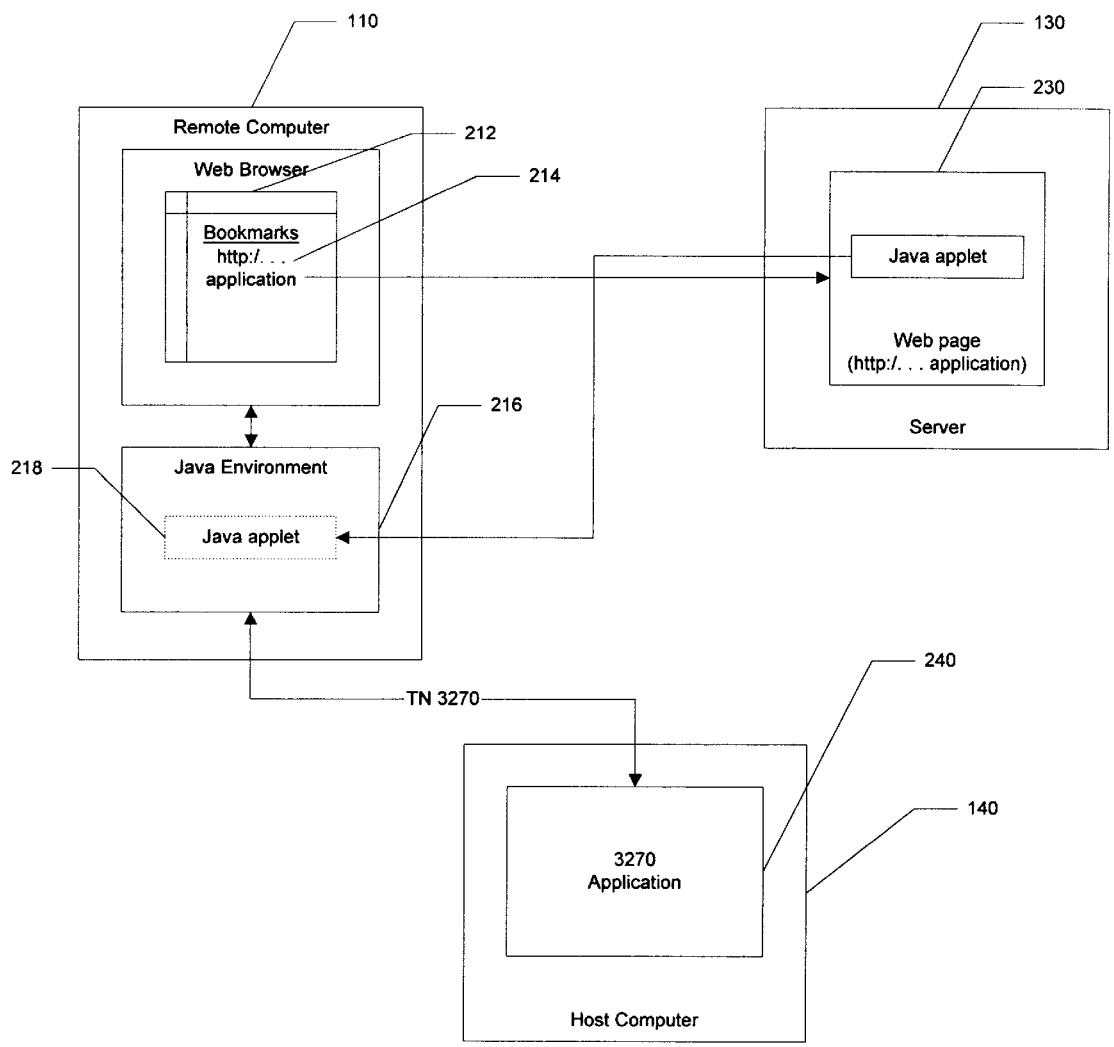

FIG. 2 provides an illustration of a system for managing sessions between and remote computer 110 and an application resident on a host computer 140, here shown as a 3270 application 240. The remote computer 110 may be configured to produce a platform-independent common environment, for example, a Java environment 216 (or, in Java nomenclature, a Java Virtual Machine). A Java applet 232 is stored on a server 130 at a resource location, for example, a Web page 230. The Java applet 232 may be downloaded to the remote computer 110 to be processed under the Java environment 216 to establish a session between the remote computer 110 and the application 240 on the host computer 140. For example, processing of the downloaded Java applet 218 may cause the remote computer to establish a user interface for the application, as well as control communications between the remote computer 110 and the application 240 according to the protocol required by the application 240, e.g., a TN3270 protocol. Those skilled in the art will appreciate that although FIG. 2 illustrates a direct connection between the remote computer 110 and the host computer 140, communications therebetween may occur through one or more intermediate devices. For example, a Java security framework may require connection of the remote computer 110 and the host computer 140 through a server.

Although the embodiment illustrated in FIG. 2 involves downloading of an applet from a server 130 which is part of a network that includes the remote computer 110, the present invention can also be implemented by loading terminal emulation information at the remote computer 110 in other ways. For example, the terminal emulation information may comprise a Java applet that is stored at a local resource location at the remote computer 110, e.g., on a hard drive, diskette, CD-ROM, or similar storage medium. The locally stored terminal emulation information may loaded directly at the remote computer 110 without requiring a network transfer and used to conduct a session between the remote computer 110 and the host application 240.

Figure 3:
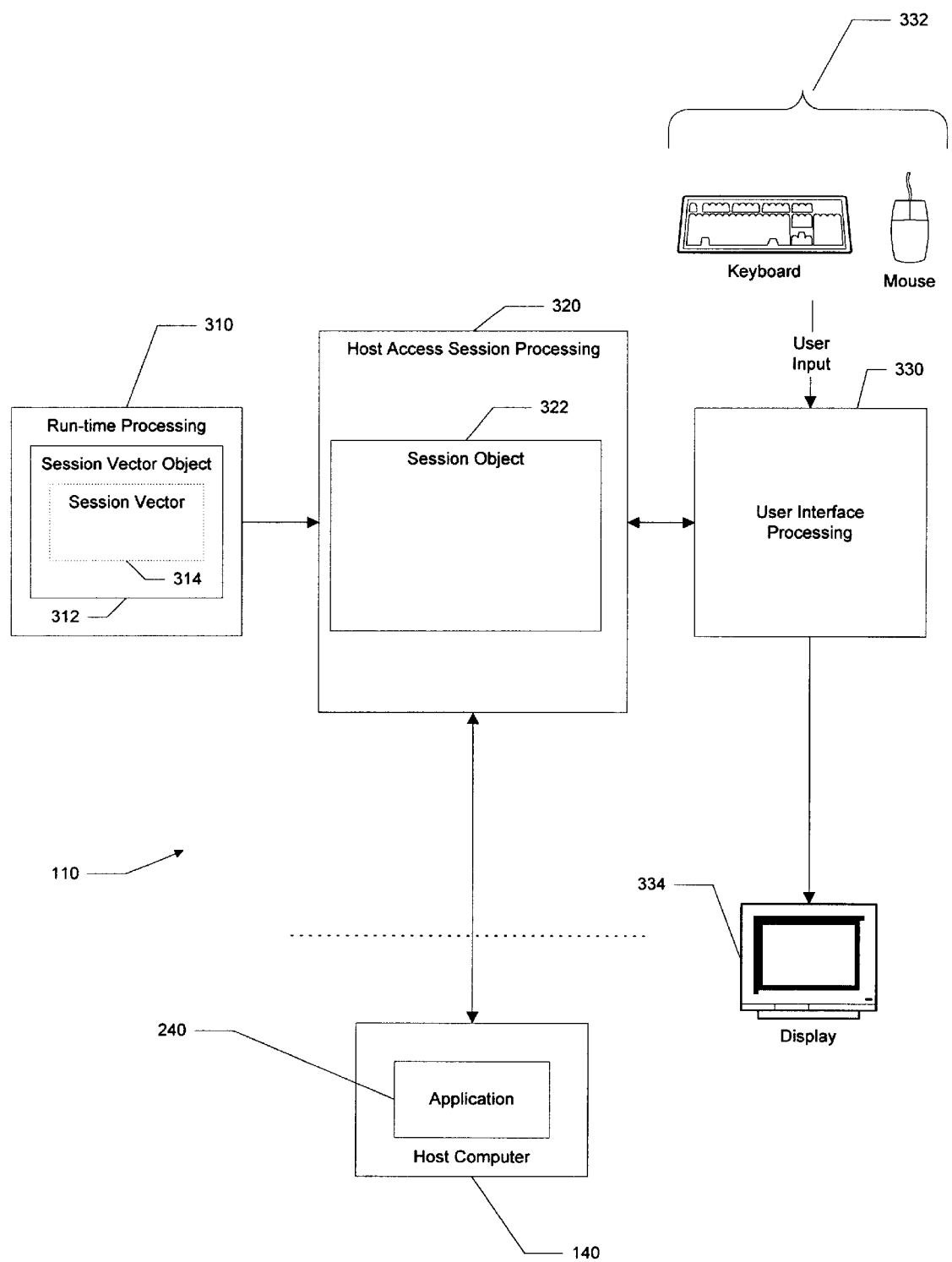
FIG. 3 is a schematic block diagram of a system for managing host-based sessions according to the present invention.

FIG. 3 illustrates an exemplary embodiment according to the present invention, in particular, an object structure for managing sessions. Host access processing 320 includes a Session Object 322 that conducts a session between a remote computer 110 and an application 240 on a host computer 140. Run-time processing 310 includes a Session Vector Object 312 that maintains a Session Vector 314 for identifying sessions between a remote computer 110 and an application 240 resident on a host computer 140. For example, the Session Vector 314 may include a "handle," i.e., an identifier, for the Session Object 322 which allows the remote computer 110 to access the associated session with the application 240 via, for instance, a user interface established by user interface processing 330. For example, the user interface processing 330 may provide a display 334 for displaying, for example, a terminal-type input/output screen, and means for accepting user inputs from input devices 332 such as a keyboard or mouse.

Operations according to various aspects of the present invention are illustrated in the flowchart illustrations of FIGS. 4, 7, 8 and 10. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

The computer program instructions may also be executed by a processor or other programmable data processing apparatus to cause a series of operational steps to be performed by the processor or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 4:
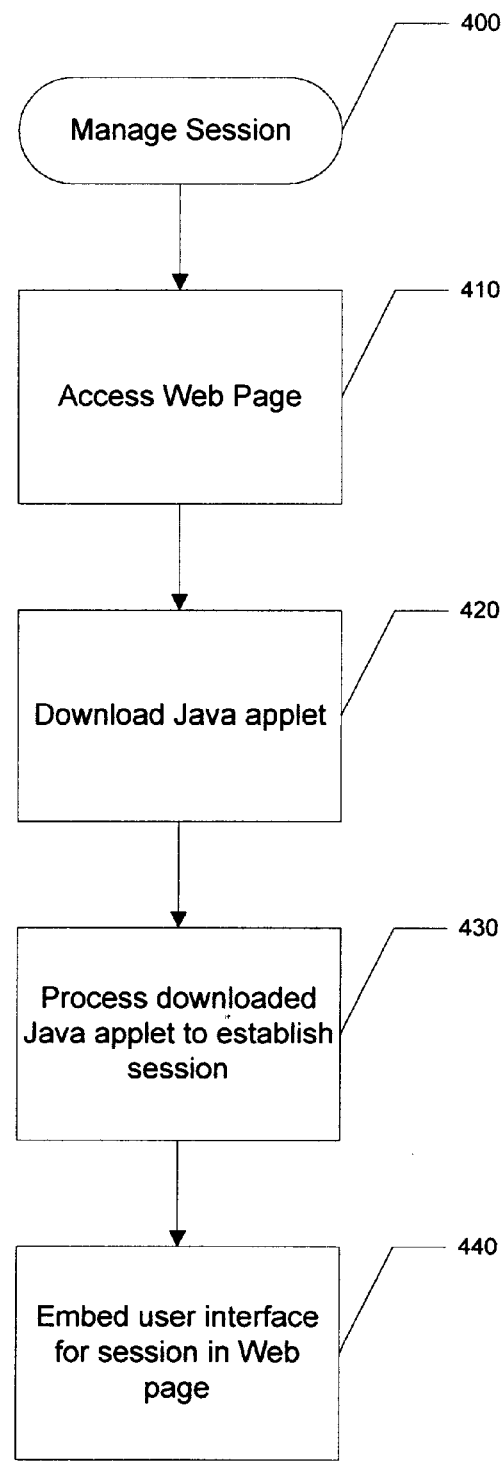
FIG. 4 is a flowchart illustration of operations for managing host-based sessions according to the present invention.

FIG. 4 illustrates basic operations (Block 400) for managing a host-based session according to the present invention. A Web page at a resource location connected to the remote computer, e.g., a server, is accessed from the remote computer (Block 410). A Java applet is downloaded from the resource location (Block 420). The downloaded applet is processed to establish a session between the remote computer and a host-based application (Block 430). A user interface to the established session is then embedded in the Web page (Block 440), for example, by further processing of the downloaded Java applet.

As known to those skilled in the art, a remote computer may access a Web page by establishing TCP/IP communications with a server hosting the Web page, more specifically, with a resource location identified by a Uniform Resource Locator (URL). Typically, the server is a personal computer, mainframe computer, minicomputer, or similar data processing device having a data processor and data storage capability. Data transferred between the remote computer and the server are processed according to the HyperText Transfer Protocol (HTTP). To access a Web page hosted at a server, a remote computer, via a Web browser or similar interface, sends a TCP/IP message to the server that represents a request for the Web page. Data for the Web page are transferred to the remote computer, and the Web page is generated on the display of the remote computer from the transferred objects. Accordingly, for purposes of the discussion herein, "Web page" may refer to both the resource location (URL) used to access a Web page, and the actual physical display of the Web page at a computer accessing the Web page.

As known to those of skill in the art, a Java applet may be embedded in a hypertext markup language (HTML) document via an "applet tag." This tag is used to describe the applet, its parameters, and its dimensions. When an applet tag is activated, the Web browser accessing the HTML document downloads code for the applet from a specified server, and executes the code on the computer at which the browser is operating. As will be appreciated by those skilled in the art, applet activation can be automatic, e.g., upon access to the HTML document, or may be activated by a user action such as selection of a button or similar object in the displayed document. Accordingly, instantiation of a Session Vector Object as described above may occur upon access to a Web page having an applet tag embedded therein, or may be initiated by selection of an item on such a page. An extensive description of HTML is provided by the "HTML Reference Manual," published by Sandia National Laboratories (1996), available on the World Wide Web at http://www.sandia.gov/sci_compute/html_ref.html.

The Web page of the embodiment of FIG. 4 preferably comprises a host access Web page as described in the related applications entitled "Systems, Methods and Computer Program Products for Conducting a Session with a Host-Based Application" and "Systems, Methods and Computer Program Products for Managing Sessions with a Host-Based Application," referred to above. The first of these applications describes downloading a Java applet from a resource location, e.g., accessing the host access Web page, and processing the downloaded applet to perform terminal emulation functions, such as Telnet protocol communications, needed to conduct host-based sessions. The second of these applications describes providing links to such sessions in the host access Web page on a dynamic basis. As described for the embodiment of FIG. 4, a special interface to a session, i.e., an "embedded session," is established by embedding a user interface to the session in the host-access Web page.

Figure 5:
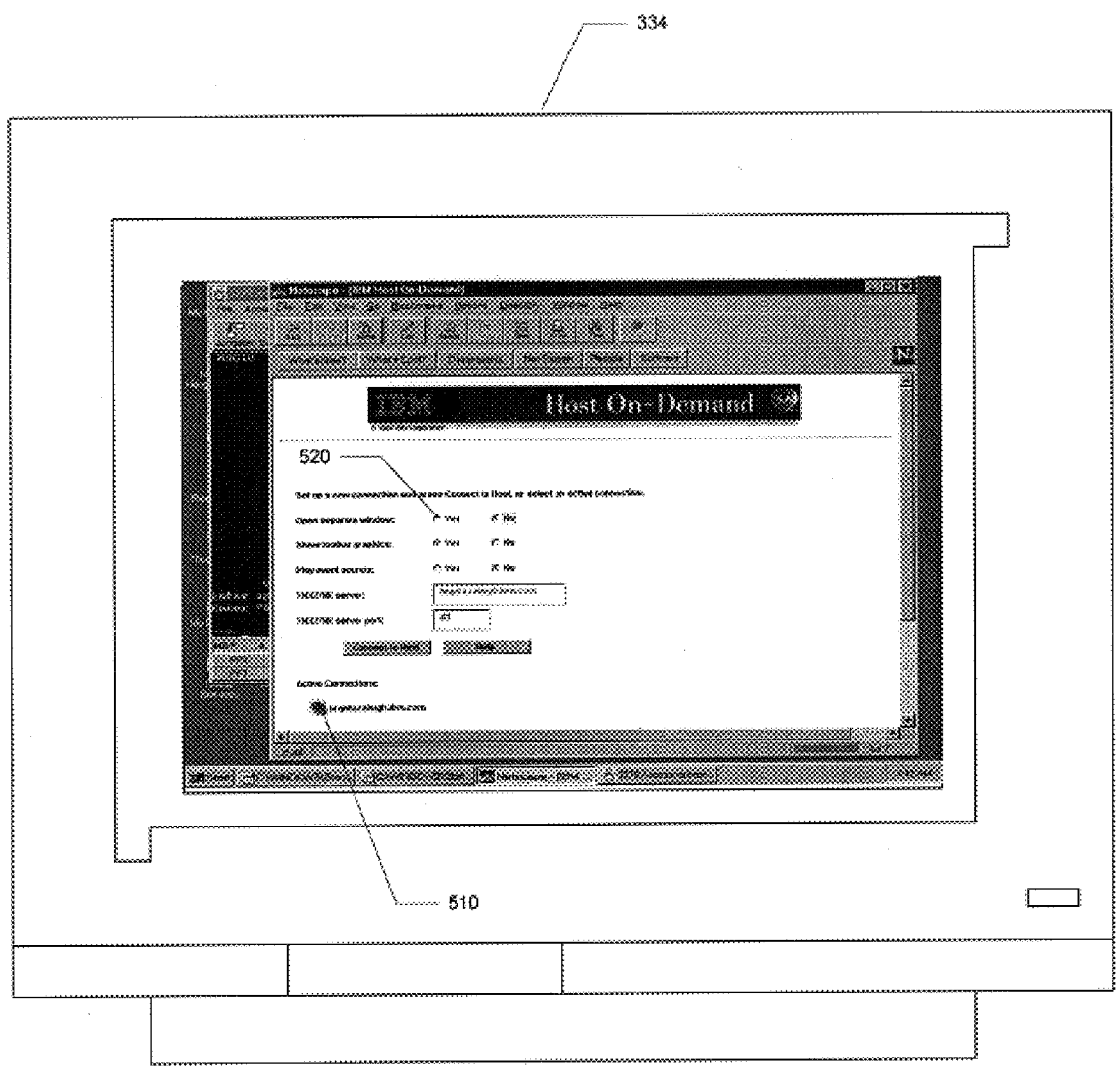
FIGS. 5–6 are illustrations of exemplary embodiments of user interfaces for managing host-based sessions according to the present invention.

FIG. 5 illustrates such a host access Web page 500. The Web page 500 includes embedded link objects 510, e.g., HTML links, which may be selected to provide access to sessions. The Web page 500 also includes various user-selectable options 520, such as "buttons" for accepting user requests to establish a session, to configure a session as an embedded session, or the like.

Figure 6:
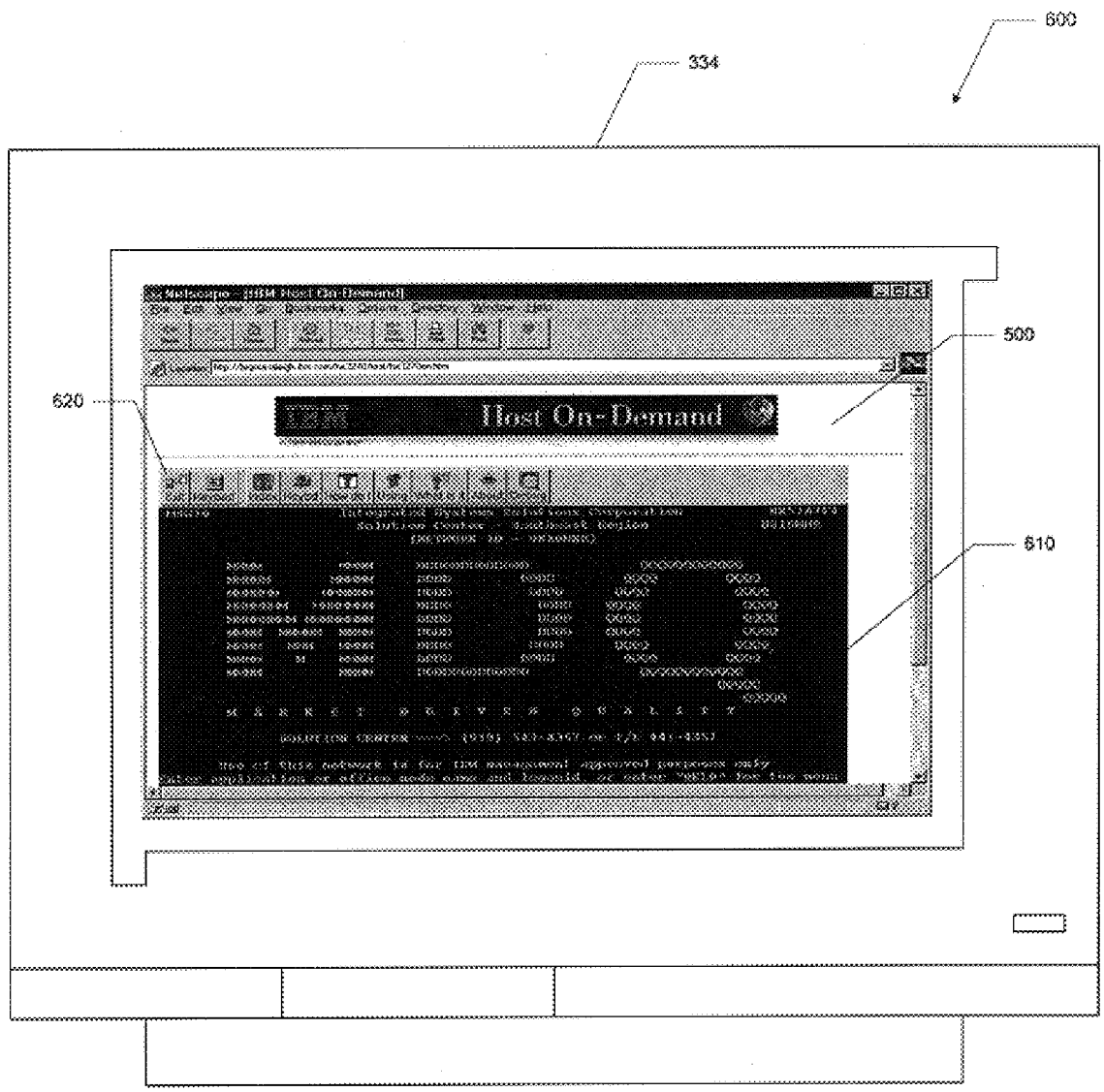

FIG. 6 illustrates a user interface 600 for an embedded session according to the present invention, including an input/output screen 610 displayed in the host access Web page 500. The screen 610 may include fields for input to or output of data from a host-based application. The detailed operation of an input/output screen such as the screen 610 is well-known to those skilled in the art; for example, the screen 620 may be a representation of data input/output screens commonly used for terminal-type applications such as 3270 applications. The screen 610 may also include user selectable options such as a button 620 for accepting a user request to exit the embedded session.

Figure 7:
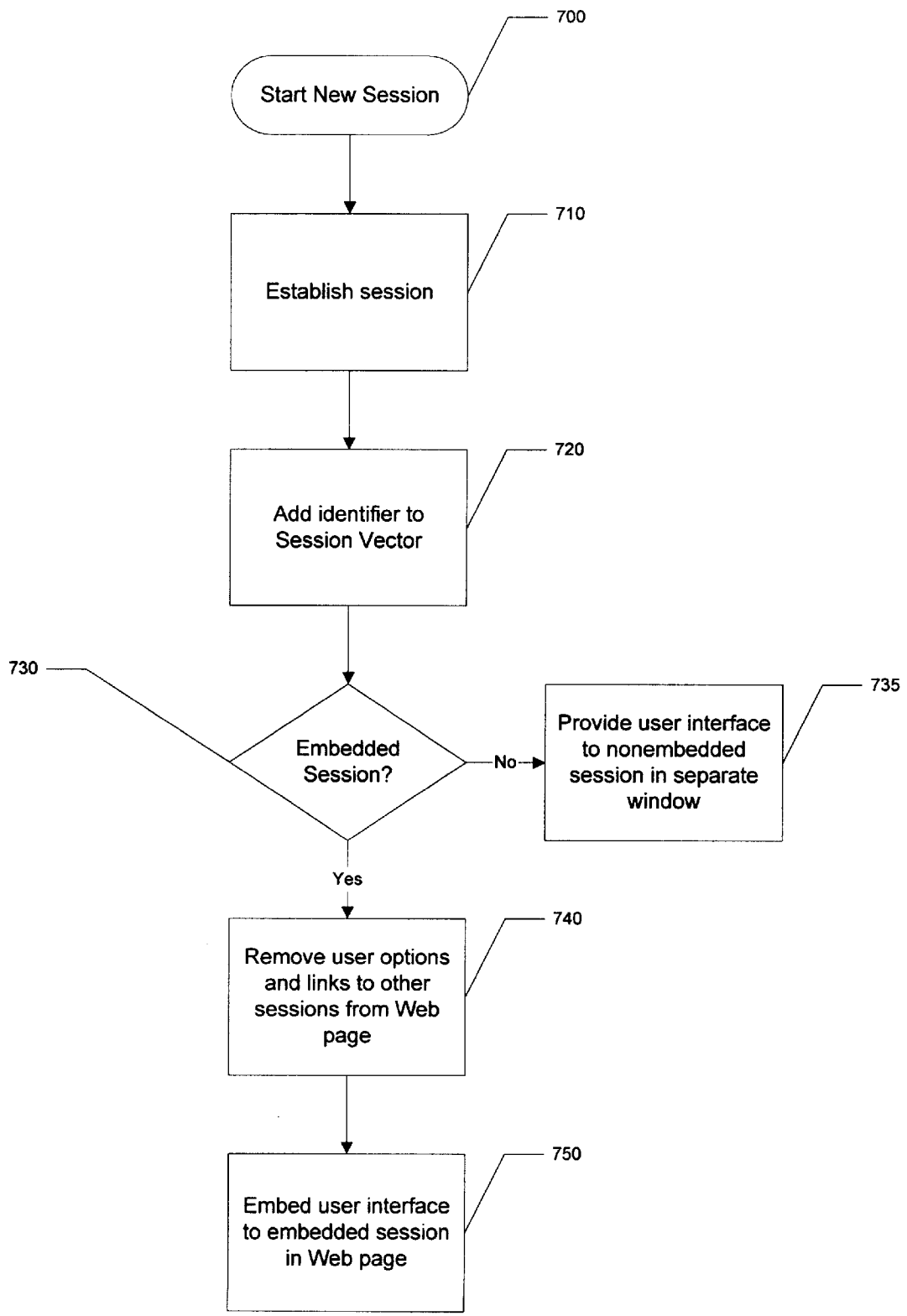
FIGS. 7–8 are flowchart illustrations of operations for managing host-based sessions according to the present invention.

FIG. 7 illustrates operations for starting such an embedded session (Block 700). A session is established between the remote computer and the host-based application (Block 710). An identifier for the established session is added to a Session Vector, e.g., a list which identifies active sessions between the remote computer and the host-based application (Block 720). If the session is to be embedded (Block 730), user options and link options to other active sessions are removed from the host access Web page (Block 740), and a user interface to the embedded session is embedded in the host access Web page (Block 750). If the session is not embedded, a user interface may be provided in another window, for example (Block 735). Upon reloading of the host access Web page, the embedded session may be identified by examining the Session Vector, and a user interface to the embedded session re-embedded into the displayed host access Web page.

Figure 8:
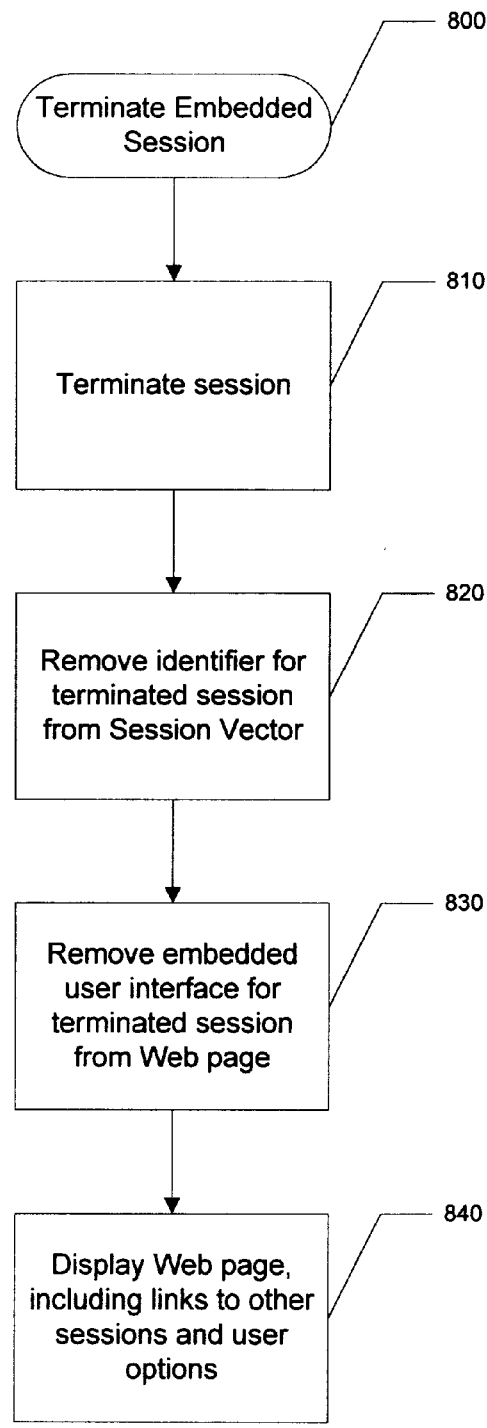

FIG. 8 illustrates operations for terminating an embedded session (Block 800). After termination of the session between the remote computer and the host-based application (Block 810), the identifier for the terminated session is removed from the Session Vector (Block 820). In response, the user interface for the terminated session is removed from the host access Web page (Block 830). The host access Web page may then be redisplayed, with user options and link objects to other sessions restored (Block 840).

Figure 9:
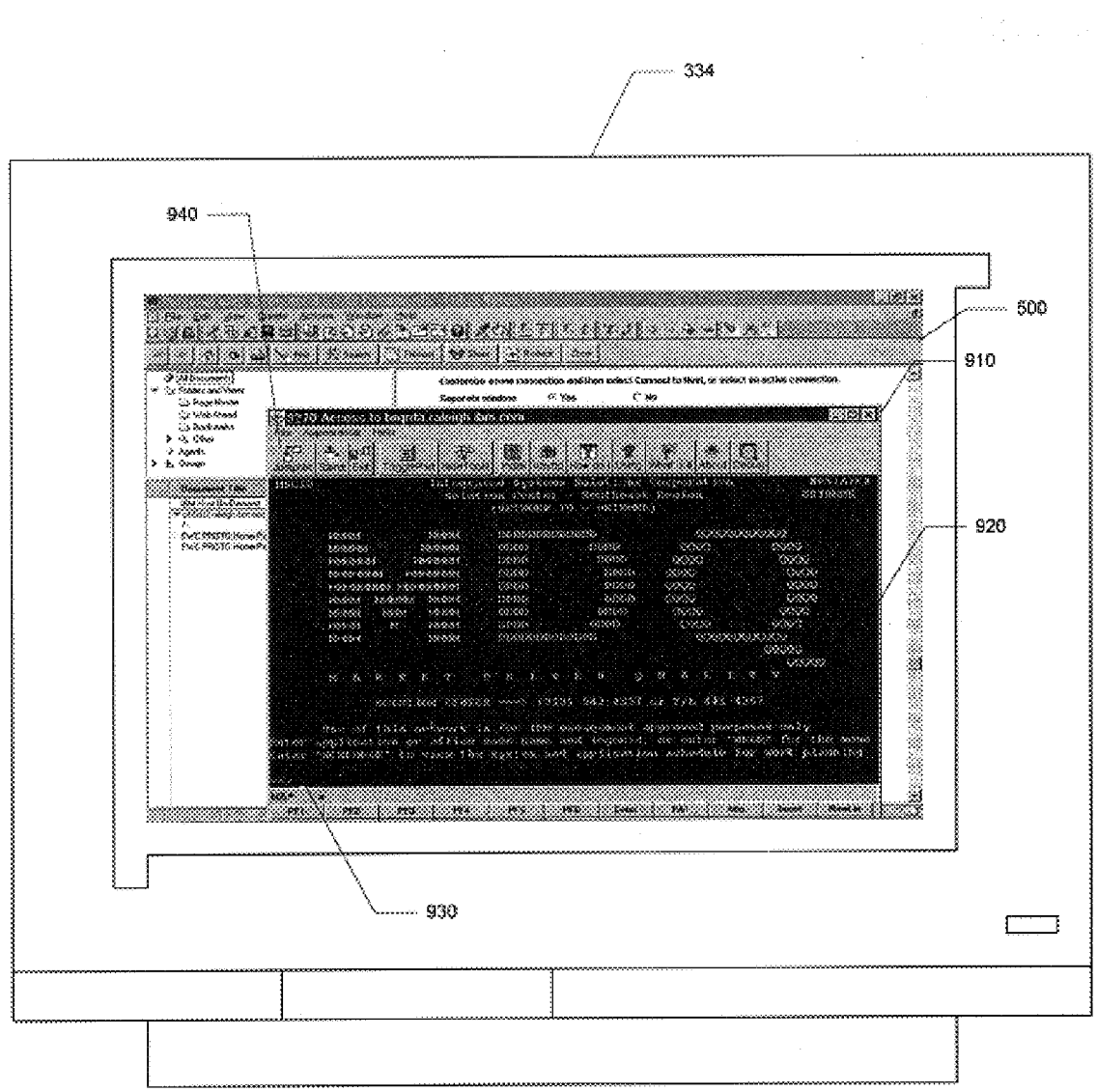
FIG. 9 is an illustration of another exemplary embodiment of a user interface for managing host-based sessions according to the present invention.

As illustrated in FIG. 9, a user interface for a session may not be embedded in the host access Web page 500, but instead, may be provided in a window 910 separate from the host access Web page 500. The user interface may include an input/output screen 920, which may include one or more fields 930 for input to and output of data from the host-based application. User-selectable options may be included in the user interface, such as a button 940 for serially accessing active host-based sessions.

Figure 10:
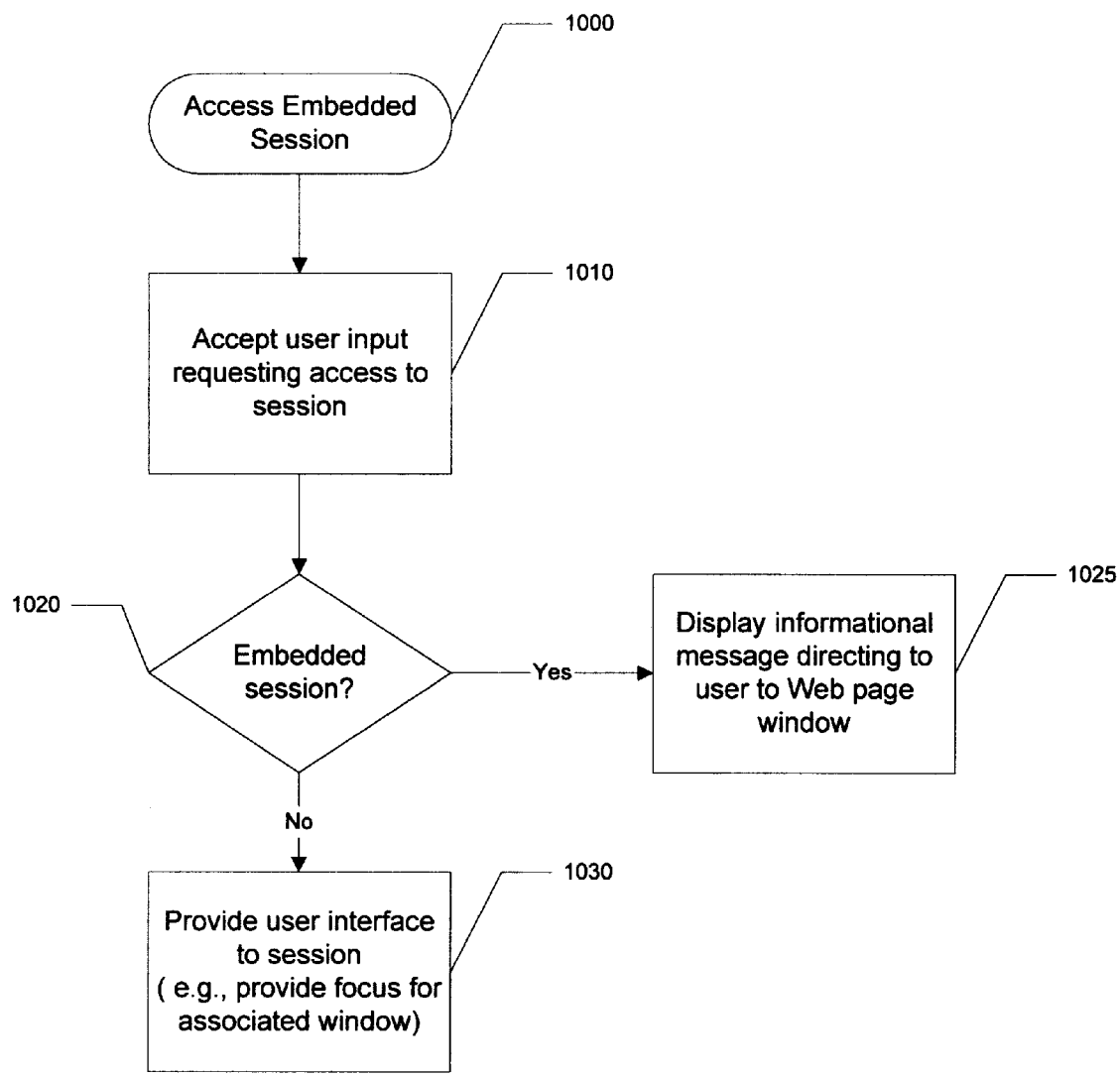
FIG. 10 is a flowchart illustration of operations for accessing an embedded host-based session according to the present invention.

Operations for accessing an embedded session from a user interface for such a nonembedded session are illustrated in FIG. 10 (Block 1000). A user input requesting access to the session, for example, a user selection of the button 940 of FIG. 9, is accepted at the remote terminal (Block 1010). If the session requested is an embedded session (Block 1020), the user is directed to the host access Web page, e.g., an informational message is displayed directing the user to the host access Web page window (Block 1025). If the session is not embedded, e.g., if a session is associated with a separate window, the window in which the user interface is provided is given focus, thus providing a user interface to the non-embedded session (Block 1030).

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of managing sessions between a remote computer and an application resident on a host computer connected to the remote computer, the method comprising the step of:

embedding a user interface for a first session between the remote computer and the application in a Web page displayed at the remote computer.

2. A method according to claim 1, wherein the user interface comprises a screen.

3. A method according to claim 1, wherein said step of embedding is preceded by the step of downloading a Java applet to the remote computer, and wherein said step of embedding comprises the step of processing the downloaded Java applet to embed the user interface for the first session in the Web page.

4. A method according to claim 3, wherein said step of embedding a user interface is preceded by the step of processing the downloaded Java applet to establish the first session between the remote computer and the application.

5. A method according to claim 1, wherein said step of embedding a user interface is followed by the steps of:

terminating the first session; and removing the user interface for the first session from the Web page.

6. A method according to claim 1, wherein said step of embedding a user interface is preceded by the step of embedding a link object for accessing a second session between the remote computer and the application in the Web page, and wherein said step of embedding a user interface is preceded by the step of removing the link object from the Web page.

7. A method according to claim 6, wherein said step of embedding a user interface is followed by the steps of:

terminating the first session;

removing the user interface for the first session; and embedding the link object for the second session in the Web page.

8. A method according to claim 1, further comprising the steps of:

displaying the Web page in a first window;

establishing a second session; and providing a user interface for the second session in a second window, the user interface including a link object associated with the first session embedded therein.

9. A method according to claim 8, wherein said step of providing a user interface for the second session is followed by the steps of:

accepting user selection of the link object associated with the first session from a user at the remote computer; and directing the user to the first window.

10. A method according to claim 9, wherein said step of directing comprises the step of displaying a message directing the user to the first window.

11. A method according to claim 1:

wherein said step of embedding is preceded by the steps of:

creating a Session Vector which identifies sessions between the remote computer and the application;

establishing a session; and identifying the established session in the Session Vector; and wherein said step of embedding a first user interface comprises the step of embedding a user interface for the session identified in the Session Vector.

12. A method according to claim 11, wherein said step of embedding a user interface for the session identified in the Session Vector comprises the step of embedding a user interface for the session identified in the Session Vector upon reloading the Web page at the remote computer.

13. A method according to claim 11, wherein said step of creating a Session Vector comprises the step of instantiating a Session Vector Object which maintains the Session Vector.

14. A method according to claim 11, wherein said step of embedding is preceded by the steps of:

accepting a user request to access the Web page; and loading the Web page in response to the user request.

15. A system for managing sessions between a remote computer and an application resident on a host computer connected to the remote computer, the system comprising:

a Web page, accessible to the remote computer, including a user interface for a first session between the remote computer and the application embedded therein.

16. A system according to claim 15, wherein the user interface comprises a screen.

17. A system according to claim 15, further comprising:
means for downloading a Java applet to the remote computer; and
means, responsive to said means for downloading, for processing the downloaded Java applet to embed the user interface for the first session in the Web page.

18. A system according to claim 17, further comprising means for processing the downloaded Java applet to establish the first session between the remote computer and the application.

19. A system according to claim 15, further comprising:
means for terminating the first session; and
means, responsive to said means for terminating, for removing the user interface for the first session from the Web page.

20. A system according to claim 15, further comprising means for embedding a link object for accessing a second session between the remote computer and the application in the Web page, and means, responsive to said means for embedding a user interface, for removing the link object for the second session from the Web page.

21. A system according to claim 20, further comprising:
means for terminating the first session;
means, responsive to said means for terminating, for removing the user interface for the first session; and
means, responsive to said means for terminating, for embedding the link object for the second session in the Web page.

22. A system according to claim 15, further comprising:
means for displaying the Web page in a first window;
means for establishing a second session; and
means, responsive to said means for establishing a second session, for providing a user interface for the second session in a second window, the user interface including a link object associated with the first session embedded therein.

23. A system according to claim 22, further comprising:
means, responsive to a user at the remote computer, for accepting user selection of the link object associated with the first session; and
means, responsive to said means for accepting user selection, for directing the user to the first window.

24. A system according to claim 23, wherein said means for directing comprises means for displaying a message directing the user to the first window.

25. A system according to claim 15, further comprising:
means for creating a Session Vector which identifies sessions between the remote computer and the application;
means for establishing a session;
means, responsive to said means for establishing a session, for identifying the established session in the Session Vector; and
means, responsive to the Session Vector, for embedding a user interface for the session identified in the Session Vector.

26. A system according to claim 25, wherein said means for embedding a user interface for the session identified in the Session Vector comprises means for embedding a user interface for the session identified in the Session Vector upon reloading the Web page at the remote computer.

27. A system according to claim 25, wherein said means for creating a Session Vector comprises means for instantiating a Session Vector Object which maintains the Session Vector.

28. A system according to claim 15, further comprising:
means, responsive to a user at the remote computer, for accepting a user request to access the Web page; and
means, responsive to said means for accepting a user request, for loading the Web page in response to the user request.

29. A computer program product for managing a session between a remote computer and an application resident at a host computer, the computer program product comprising:
a computer-readable program storage medium having a computer-readable information embodied therein configured to provide a Web page at a Web browser accessing the computer-readable information, the Web page including a user interface embedded therein for a session between the remote computer and the application.

30. A computer program product according to claim 29, wherein the user interface comprises a screen.

31. A computer program product according to claim 29, wherein said computer-readable information comprises:
computer-readable program code means for terminating the first session; and
computer-readable program code means, responsive to said computer-readable program code means for terminating, for removing the user interface for the first session from the Web page.

32. A computer program product according to claim 29, wherein said computer-readable information comprises:
computer-readable program code means for embedding a link object for accessing a second session between the remote computer and the application in the Web page;
computer-readable program code means, responsive to said computer-readable program code means for embedding a user interface, for removing the link object for the second session from the Web page.

33. A computer program product according to claim 29, wherein said computer-readable information comprises:
computer-readable program code means for terminating the first session;
computer-readable program code means, responsive to said computer-readable program code means for terminating, for removing the user interface for the first session; and
computer-readable program code means, responsive to said computer-readable program code means for terminating, for embedding the link object for the second session in the Web page.

34. A computer program product according to claim 29, wherein said computer-readable information comprises:
computer-readable program code means for displaying the Web page in a first window;
computer-readable program code means for establishing a second session; and
computer-readable program code means, responsive to said computer-readable program code means for establishing a second session, for providing a user interface for the second session in a second window, the user interface including a link object associated with the first session embedded therein.

35. A computer program product according to claim 34, wherein said computer-readable information further comprises:
computer-readable program code means, responsive to a user at the remote computer, for accepting user selection of the link object associated with the first session; and computer-readable program code means, responsive to said computer-readable program code means for accepting user selection, for directing the user to the first window.

36. A computer program product according to claim 35, wherein said computer-readable program code means for directing comprises computer-readable program code means for displaying a message directing the user to the first window.

37. A computer program product according to claim 29, wherein said computer-readable information comprises:

computer-readable program code means for creating a Session Vector which identifies sessions between the remote computer and the application;

computer-readable program code means for establishing a session;

computer-readable program code means, responsive to said computer-readable program code means for establishing a session, for identifying the established session in the Session Vector; and computer-readable program code means, responsive to the Session Vector, for embedding a user interface for the session identified in the Session Vector.

38. A computer program product according to claim 37, wherein said computer-readable program code means for embedding a user interface for the session identified in the Session Vector comprises computer-readable program code means for embedding a user interface for the session identified in the Session Vector upon reloading the Web page at the remote computer.

39. A computer program product stem according to claim 37, wherein said computer-readable program code means for creating a Session Vector comprises computer-readable program code means for instantiating a Session Vector Object which maintains the Session Vector.

40. A computer program product according to claim 29, wherein said computer-readable information comprises a Java applet.

* * * * *

UNITED STATES PATENT AND TRADEMARK OFFICE
CERTIFICATE OF CORRECTION

PATENT NO. : 5,964,836
DATED : October 12, 1999
INVENTOR(S) : Rowe et al.

It is certified that error appears in the above-identified patent and that said Letters Patent is hereby corrected as shown below:

Title page,
Item [56], References Cited, OTHER PUBLICATIONS, please add:
-- Université de Genèvé website, www.unige.ch/hotjava, "TN3270 Java Emulator and Libraries" Sun Microsystems website, Java.sun.com, "HotJava" --

Signed and Sealed this

Fifth Day of July, 2005

JON W. DUDAS
*Director of the United States Patent and Trademark Office*